United States Patent Office 3,472,892
Patented Oct. 14, 1969

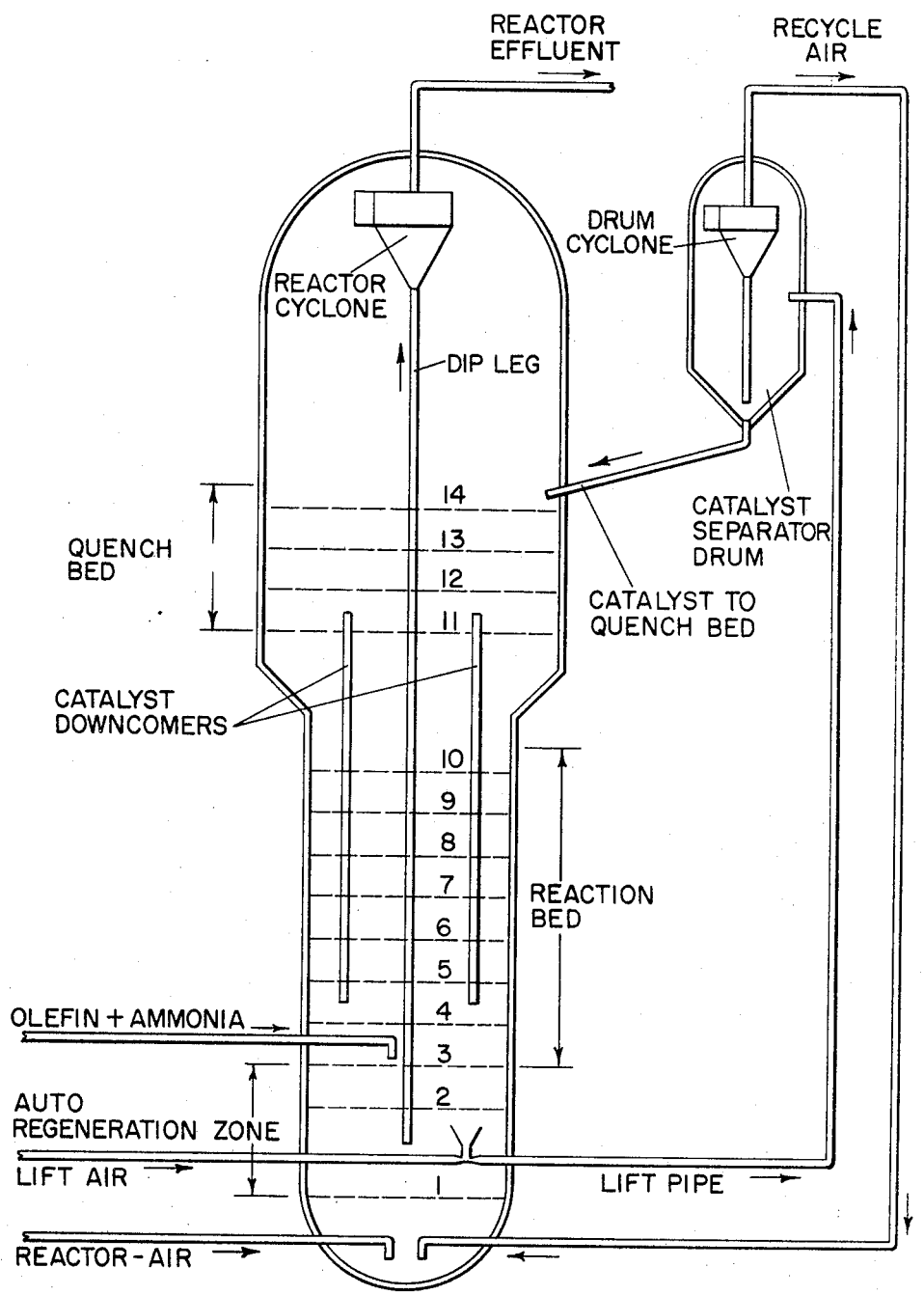

3,472,892
FLUID BED PROCESS FOR SYNTHESIS OF NITRILES BY AMMOXIDATION AND THE RECYCLING OF AMMONIA-RICH CATALYST FROM A QUENCH ZONE TO A REACTION ZONE
James L. Callahan, Bedford, and Ernest C. Milberger, Solon, Ohio, assignors to The Standard Oil Company, Cleveland, Ohio, a corporation of Ohio
Filed May 10, 1967, Ser. No. 637,407
Int. Cl. C07c 121/02
U.S. Cl. 260—465.3                    7 Claims

ABSTRACT OF THE DISCLOSURE

The instant process utilizes the discovery that fluidized solid oxidation catalysts used in the conversion of olefins to unsaturated nitriles exhibit a variable ammonia adsorptive capacity, which may change severalfold over a relatively narrow temperature range, to trap excess ammonia required in a fluid-bed reactor and then re-use it.

BACKROUND OF THE INVENTION

The instant process has special application when solid oxidation catalysts are used in fluid-bed reactors wherein the feed comprises a gaseous mixture of an olefin, ammonia and a molecular oxygen-containing gas. Effluent from the reactor comprises the desired unsaturated nitrile product, unreacted ammonia, inert gases, water vapor, catalyst "carry-over" and other by-products of reaction. Processes using fluid-bed reactors in the catalytic oxidation of olefins and ammonia are the subject of a large number of patents both United States and foreign, and are well-known in the art.

More particularly, the process of the instant invention relates to the recovery of and subsequent re-use of excess ammonia in a "zoned" fluidized bed reactor utilizing an acid-acting catalyst which is used in the ammoxidation of propylene to acrylonitrile and of isobutylene to methacrylonitrile.

By a "zoned" fluidized bed reactor is meant a fluidized bed reactor with at least two major zones: a "reaction" zone in which the main synthesis reaction is effected and a "quench" zone disposed above the reaction zone and downstream of it, the hot effluent from the reaction zone being quenched in the quench zone. The fluid catalyst in the "quench" and "reaction" zones is referred to as the quench bed and the reaction bed, respectively, though generally the terms "zone" and "bed" are used more or less interchangeably.

In the preferred embodiment of the instant invention, the "zoned" fluidized bed reactor has, in addition to the quench and reaction zones, a third major zone called the "autoregeneration" zone which is in the bottom of the reactor. The purpose of this zone is to maximize the probability of maintaining catalyst in an active and selective state by contact with molecular oxygen-containing gas.

By "acid-acting" catalyst is meant a catalyst on a catalyst-support which together exhibit an acidic character in that they display an acidic reaction upon titration. Catalysts of this type are disclosed in U.S. Patents 2,904,580; 3,044,966; 3,197,419; 3,200,084; 3,248,340; 3,050,546; 3,198,750; 2,481,826; British Patent Nos. 874,-593 and 904,418; Belgian Patent Nos. 592,434; 593,097; 598,511; 603,030; 612,136; 615,605; and, 603,031; Canadian Patent No. 619,497; French Patent No. 1,278,289.

U.S. Patent No. 3,230,246 discloses a process for the fluidized bed oxidation of a monoolefin in the presence of ammonia utilizing a sieve-tray reactor which, in operation, is a plurality of semi-isolated fluidized beds. Copending application Ser. No. 408,723 teaches a process for the fluidized bed oxidation of a monoolefin for the preparation of unsaturated aldehydes and nitriles utilizing a sieve-tray reactor with an autoregeneration zone.

Ammonia, along with other polar molecules, is strongly adsorbed on high-surface-area acid-acting catalysts even at relatively high temperatures. The adsorption characteristics of most acid-acting catalysts for ammonia are such that their adsorptive capacity may change several fold over a temperature range of only a few hundred degrees.

In general, the other components present in the nitrile-synethsis reactor are much less strongly adsorbed than ammonia at any particular elevated temperature above about 300° F. Thus at a given elevated temperature ammonia will be rather strongly adsorbed while acrylonitrile, acetonitrile, hydrogen cyanide, carbon oxides, propylene, and nitrogen will be only very weakly adsorbed.

It will be noted that in the above-mentioned ammoxidation processes an excess of ammonia is desirable if good yields are to be obtained. However, the effluent containing the free ammonia must be quenched with an acidic quenching medium to neutralize the ammonia and cool the reactants to prevent the ammonia causing degradation of useful products of reaction either by base catalysis or by direct reaction. It has been the practice to remove this excess unreacted ammonia from the hot reactor effluent by spraying dilute mineral acid in the reactor effluent, forming the acid salt. The cost of subsequently recovering the salt in salable form added to the cost of acid consumed, is barely offset by the sale of the salt. In other words, it would be economically more desirable to re-use the unreacted ammonia in the process and thus eliminate the need for acid, recovery of the salt and other problems. The process of the instant invention does so.

It will be evident that it is essential that the quench zone be substantially cooler than the reaction zone if it is to function as a "sponge" for excess ammonia. To this end it is necessary to use a foraminous support member through which both catalyst and reactor gases may be afforded free passage, but which in operation acts so as to allow limited downward movement of catalyst through it, and essentially only upward movement of reactor gases through it. It is not essential that there be more than this single foraminous member in the entire reactor. Feeding reactants olefin and ammonia into the reactor above the reactor air inlet will generate at least two zones, namely, a reaction zone and a quench zone. Under carefully controlled conditions it is feasible to operate the fluid-bed reactor with three well-defined zones, namely, a reaction zone, a quench zone and an autoregeneration zone. As would be expected, better definition and control of the zones is obtained when formainous members, usually sieve trays with predetermined open areas corresponding to requirements of preferred pressure drop, desirable catalyst recirculation rates and stable reactor conditions, are disposed within the reactor at desirable spacings.

SUMMARY

The discovery that excess ammonia may be conveniently absorbed on a suitable oxidation catalyst and then desorbed as it is utilized in the synthesis of unsaturated nitrile product by carrying out the reaction in a zoned fluidized bed reactor, is the basis of the instant invention.

An object of the instant invention is to provide a process for adsorbing excess ammonia on a fluidized solid catalyst, and to provide a means for conveying said catalyst with adsorbed ammonia into the reaction zone where the ammonia it utilized in the desired reaction.

Another object of the instant process is to provide a process comprising contacting a mixture comprising a monoolefin having from 3 to 4 carbon atoms such as propylene or isobutylene, ammonia and oxygen with a fluidized solid catalyst at an elevated temperature, at atmospheric or near atmospheric pressure in a plurality of semi-isolated fluidized beds.

Another object of the instant invention is to provide a zoned reactor wherein the semi-isolated fluidized beds are disposed in a predetermined manner such that unreacted ammonia emerging from the reaction zone is preferentially adsorbed on cooler catalyst in the quench zone, which catalyst is returned to some point in the reaction zone.

Still another object of the instant invention is to provide a process wherein the ammonia concentration in the gas evolving from the reactor may be monitored so that it is substantially zero, the amount of ammonia being fed to the reaction zone being so adjusted as to maintain the concentration of ammonia in the effluent from the reactor at the aforesaid zero level.

BRIEF DESCRIPTION OF THE DRAWING

The preferred apparatus in which the process of the instant invention is practiced is illustrated in the attached drawing. It consists of a reactor equipped with a plurality of foraminous members. The foraminous members, commonly called sieve-trays (14 are shown in the drawing) are disposed in a predetermined manner forming semi-isolated fluidized catalyst beds when the gaseous feed stream, reactor-air and lift-air are forced into the catalyst lying in the bottom of the reactor.

Sieve-trays 1 to 3 comprise the autoregeneration zone.
Sieve-trays 4 to 10 comprise the reaction zone.
Sieve-trays 11 to 14 comprise the quench zone.

Sieve-trays 11 to 14 comprise the quench zone. Catalyst downcomers are provided which conduct catalyst from sieve-tray 11 to sieve-tray 4. Cyclones are provided in the top of the reactor, the dip-legs of the cyclones dropping catalyst into the autoregeneration zone.

A catalyst separator drum is proximately disposed to the reactor. A lift-pipe lifts fully oxidized catalyst from the bottom of the reactor to the catalyst separator drum. Cyclones are provided in the catalyst separator drum. Catalyst from the separator drum is led into the quench bed of the reactor.

DESCRIPTION OF THE PREFERRED EMBODIMENT

An apparatus for conducting the instant invention is a "zoned" reactor fitted with at least one sieve tray and preferably 14 sieve-trays as illustrated in the drawing. The reactor is zoned after catalyst in the reactor is fluidized in such a manner and operated under such conditions that the fluid bed equilibrates into three major "zones" as follows: The "Reaction Zone"—that portion of the fluid bed in which the ammoxidation reaction takes place; physically the reaction zone is in the mid-section of the reactor. The "Quench Zone"—that portion of the fluid bed directly above the reaction zone in which the effluent from the reaction zone is quenched and in which the excess ammonia, carried out of the reaction zone along with products of reaction, is absorbed by relatively cool catalyst. The "Autoregeneration Zone"—that portion of the fluid bed directly beneath the reaction zone, into which catalyst from the reaction zone gravitates and which is continuously subjected to molecular oxygen-containing gas.

The reactor may be of any design commensurate with good engineering construction. It is preferred that a generally cylindrical, vertical reactor be used with an enlarged section on top to accommodate the increased gaseous volume of reaction products in the quench zone.

Cyclones are provided in the top of the reactor to separate the catalyst carry-over from the gases about to leave the reactor. Dip-legs subtended from the cyclones transfer the catalyst from the cyclones into the autoregeneration zone.

Catalyst in a highly oxidized state from the autoregeneration zone is led back into the quench zone by any conventional means for transferring a finely divided solid from a lower level to a higher level. For example, a continuous bucket elevator or an endless belt may be used with suitable gas locks for transferring catalyst out of the autoregeneration zone and into the quench zone. A preferred means for effecting this transfer is by the use of an air lift using auxiliary "lift-air" to fluid-convey catalyst from the autoregeneration zone up a "lift-pipe" into a catalyst separator drum. Cyclones in the top of the catalyst separator drum assist in separating the cool regenerated catalyst from the lift-air. Dip-legs subtended from the separator drum cyclones drop the catalyst into the bottom of the separator drum from where it is fed to the quench zone, preferably by gravity flow. Lift-air from which catalyst has been extracted in the separator drum may be vented, but is preferably recycled to the autoregeneration zone.

In a preferred embodiment of the instant sieve-tray reactor illustrated in the drawing, tray No. 1 is an air distribution grid, a tray with less than 10 percent open area. During operation there is very little catalyst below tray No. 1. The space below tray No. 1 functions as a plenum chamber which allows an even distribution of the air. Trays Nos. 2, 3, 4, 5, 6, 7, 8, 9 and 10 are trays with open areas in the range 15 to 60 percent. Trays Nos. 1 to 3 comprise the autoregeneration zone. Trays 11, 12, 13 and 14 comprise the quench bed. Downcomers are provided which extend from the quench bed into the reaction zone. The position of the intakes of the catalyst downcomers in the quench bed is determined by considerations of pressure drop and control of the level of the quench bed.

The reaction bed temperature is maintained between 850° and 950° by means of heat removal through cooling coils placed within the reaction zone. The quench zone is operated to maintain a temperature between 600 and 900° F. Catalyst of suitable size would be particles in the range of 15 to 150 microns. A suitable surface area for the catalyst is in the range between 15 and 100 square meters per gram (computed as in the B.E.T. method).

The following is a detailed operating description of the process of the instant invention.

Fresh catalyst is loaded into the reactor and reactor-air is led into the bottom of the reactor to fluidize the catalyst. The feed mixture comprising an olefin and ammonia is led into the reaction zone preferably right above the autoregeneration zone. Since the ammoxidative nitrile syntheses reaction is a highly exothermic one, the heat of reaction is continuously removed from the reaction zone by cooling coils so that the temperature of the reaction zone is maintained between 850 and 950° F. The amount of ammonia in the feed is adjusted so that about 10 percent of the ammonia being continuously fed to the reaction zone emerges unreacted from the reaction zone and enters the quench zone along with products of reaction. After the reactor has lined out, the excess ammonia is cut to about one percent as the ammonia accumulated on the catalyst serves as a source of supply. Ammonia is preferentially adsorbed on the relatively cool catalyst of the quench zone which is maintained in the range of 600 to 900° F. The remaining products of reaction from the reaction zone pass through the quench zone relatively unadsorbed and are then led into cyclones in the top of the reactor where catalyst carry-over is returned to the autoregeneration zone, and the gaseous products of reaction are let out of the reactor as reactor effluent. Downcomers from the quench zone constantly deplete the quench zone by pouring catalyst with adsorbed ammonia back into the reaction zone. The level of catalyst in the quench zone in turn is continuously maintained by controlling reactor operating conditions and by regulating feed from the catalyst seperator drum. The temperature level of the quench zone must be maintained at least 50° F. below the temperature of the reaction zone. This may be done either by replenishing the quench zone with cool catalyst from the separator drum or by removing heat from the quench zone by cooling coils placed directly in the quench zone, or both.

The bottom sieve tray of the quench bed, namely tray 11, is a "tight" tray, which means that it allows a limited movement of catalyst downwardly through it, but freely allows gases to pass upwardly through it. Most of the highly active ammonia-rich catalyst from the quench bed is led by the catalyst downcomers into the lower section of the reaction bed when it is quickly contacted by the gases introduced into the lower section of the reactor. In practice, the inlets of the catalyst downcomers project through the "tight" tray so as to transport catalyst from the compartment between trays 13 and 14 into the compartment between trays 4 and 5. As the difference in temperature between the quench bed and the reaction bed is preferably about 250° F., which difference is to be maintained if the adsorbed ammonia is to be retained on the catalyst, the downcomers are provided with steam jackets which have the effect of insulating the downflowing relatively cool catalyst from the hotter reaction bed.

The process of the instant invention is not effective when the temperature of the quench bed falls to about 300° F. or lower. At temperatures below 300° F. the absorption of acrylonitrile and other reaction products becomes excessive and depending upon the pressure of the operation of the quench bed, gross condensation may occur.

During operation the fluid bed of the instant invention equilibrates itself into the three major zones hereinabove identified. Each zone is separated from the other by a distinct dense phase-gas phase interface. In addition, there is a stratification of densities of the catalyst bed within each zone. It will be seen that highly active catalyst in the quench bed serves both to cool the reactor effluent from the reaction zone as well as to adsorb ammonia. The catalyst with adsorbed ammonia falls to the reaction zone where the ammonia is utilized in the ammoxidative nitrile syntheses. The catalyst from the reaction zone can recirculate into the autoregeneration zone below, where in the oxidizing environment provided by the presence of air only, the probability of maintaining the catalyst in a highly active state is maximized.

Lift-air is used to fluid-convey catalyst from the autoregeneration zone to the separator drum. This step may be avoided by relying on natural circulation of catalyst between the reaction zone and the quench zone, and between the autoregeneration zone and the reaction zone for necessary catalyst transference. This would require careful design of the "tight" tray to allow upward movement of catalyst through it, yet minimize downflow of catalyst. It would also result in less controllable contact times with proportionately less controllable by-product formation. The results generally are found to be much less satisfactory than with the positive circulation provided by the fluid-lift system combined with the preferred operation of the quench bed with catalyst downcomers, described hereinabove.

In the following example excess ammonia was adjusted so that only one percent of the ammonia fed to the reactor appeared from the reaction zone and was conducted into the quench zone. All parts referred to are "parts by weight" unless otherwise specified.

Example

A catalyst system composed of antimony oxide and uranium oxide, having an Sb:U atomic ratio of 4.56:1 was prepared as follows:

45 parts of antimony metal (through 80 mesh) were completely oxidized in 256 parts of hot, concentrated nitric acid (sp.-gr. 1.42). 40.7 parts uranyl nitrate, $$UO_2(NO_3)_2 \cdot 6H_2O$$

were added and the mixture evaporated almost to dryness. Then 88 parts of Du Pont Ludox® H–S (containing 30% $SiO_2$) were added. Then ammonium hydroxide (28% solution) was added until the solution registered pH 8. The precipitate was filtered and washed with water. The material was oven-dried at 120° C. for 15 hours, then calcined at 800° F. for 24 hours and finally heat treated at 1800° F. for 8 hours.

The material was cooled and subsequently ball-milled to pass through a 170 mesh screen, then thoroughly ball-milled with another 88 parts of Du Pont Ludox® H–S (containing 30% $SiO_2$) to give a paste which was spray-dried. The spray-dried catalyst was then heat-treated at 1700° F. for 12 hours in a furnace open to the atmosphere.

400 pounds of this catalyst was loaded into a sieve tray reactor with fourteen (14) sieve trays. Trays 1 to 3 (numbering from the bottom) comprised the autoregeneration zone. Trays 4 to 10 comprised the Reaction Bed. Trays 11 to 14 comprised the Quench Zone. Dip-legs were provided from the 11th tray to the 4th tray.

Gas feed was measured by Rotameters. A sample probe was placed just above tray 14 to monitor the breakthrough of ammonia, if any. Lift air equivalent to the amount of reactor air was provided at a temperature of 160° F.

Molar ratios in the feed were:

Propylene/$NH_3$/air = 1/1.02/12

Apparent contact time in the reaction bed was 5 seconds. The reaction bed temperature was 860–880° F. The total conversion was 79.5% per pass of which 50% of the propylene feed was converted to acrylonitrile.

No breakthrough of ammonia was noted at the sample probe.

We claim:

1. A process for the manufacture of an olefinically unsaturated nitrile having the structure $$CH_2=C-CN$$
$$|$$
$$R$$

wherein R is a member selected from the group consisting of hydrogen and a methyl radical comprising
 (a) contacting a mixture comprising a monoolefin having the structure $$CH_2=C-CH_3$$
$$|$$
$$R$$

wherein R has the foregoing designation, ammonia and molecular oxygen containing gas with a fluidized high-surface area solid acidic ammoxidation catalyst at a temperature in the range of 550° F. to 1000° F. at from about atmospheric pressure up to about 250 p.s.i.g. in at least two communicating reaction compartments, one disposed above the other, each communicating with and being separated from the next adjacent one by a foraminous member.
 (b) adjusting the mass flow of gases to the lower reaction compartment to define at least two zones, namely a reaction zone and a quench zone, said quench zone being downstream of said reaction zone.
 (c) maintaining the temperature of said reaction zone within the range from about 850° F. to 950° F. and the temperature of said quench zone within the range from about 600° F. to 900° F.,
 (d) maintaining a ratio of ammonia to monoolefin in the feed such that at least one percent of the ammonia feed emerges as excess ammonia from said reaction zone,
 (e) adsorbing a substantial portion of said excess ammonia onto the catalyst in said quench zone forming relatively cool, ammonia-rich catalyst, and (f) introducing said ammonia-rich catalyst from said quench zone into said reaction zone whereby said excess ammonia adsorbed on said catalyst is recovered for re-use in the ammoxidation of said monoolefin.

2. The process of claim 1 wherein said olefin and ammonia are introduced into said lower reaction compartment above the point of introduction of said molecular oxygen containing gas.

3. The process of claim 2 comprising, in addition, transferring catalyst from the bottom of said reactor into said quench zone.

4. In a process for the manufacture of an olefinically unsaturated nitrile having the structure

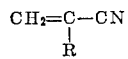

wherein R is a member selected from the group consisting of hydrogen and a methyl radical comprising contacting a mixture comprising a monoolefin having the structure

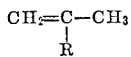

wherein R has the foregoing designation, ammonia and oxygen with a fluidized high-surface area solid acidic ammoxidation catalyst at a temperature in the range of 550° F. to 1000° F. at from about atmospheric pressure up to about 250 p.s.i.g. in at least four communicating reaction compartments, each communicating with and being separated from the next adjacent one by a foraminous member, the improvement consisting of:

(a) adjusting the mass flow of gases to said reactor to define an autoregeneration zone, a reaction zone and a quench zone, said reaction zone being downstream of said autoregeneration zone, said quench zone being downstream of said reaction zone;

(b) maintaining the temperature of said reaction zone within the range from about 850° F. to 950° F.; the temperature of said quench zone within the range from about 600° F. to 800° F.; and the temperature of said autoregeneration zone within the range from about 850° F. to 1000° F.;

(c) maintaining a ratio of ammonia to monoolefin in the feed such that at least one percent of the ammonia feed emerges as ammonia from said reaction zone;

(d) transferring catalyst from said autoregeneration zone to said quench zone wherein said excess ammonia is adsorbed forming relatively cool, ammonia-rich catalyst, and (e) introducing said ammonia-rich catalyst from said quench zone into said reaction zone whereby said excess ammonia adsorbed on said catalyst is re-utilized in the ammoxidation of said monoolefin.

5. The process of claim 4 wherein said autoregeneration zone comprises at least one communicating fluidized bed, said reaction zone comprises at least four communicating fluidized beds; said quench zone comprises at least one communicating fluidized bed.

6. The process of claim 4 wherein step (d) comprises air-conveying catalyst from said autoregeneration zone, separating said catalyst from the air, conducting said catalyst separated from said air to said quench zone, and recycling said air separated from said catalyst to said autoregeneration zone.

7. The process of claim 6 comprising cooling catalyst separated from the air to about 50° F. below the operating temperature of said quench zone.

References Cited
UNITED STATES PATENTS 3,280,166  10/1966  Callahan et al. ____ 260—465.3

JOSEPH P. BRUST, Primary Examiner